United States Patent
Moolenaar

[15] 3,637,349
[45] Jan. 25, 1972

[54] ALKALI METAL-ALKALINE EARTH METAL HYDROXIDES

[72] Inventor: Robert J. Moolenaar, Midland, Mich.
[73] Assignee: The Dow Chemical Company, Midland, Mich.
[22] Filed: Dec. 22, 1969
[21] Appl. No.: 887,391

[52] U.S. Cl. ................................................. 23/183
[51] Int. Cl. .................................. C01f 11/00, C01f 11/02
[58] Field of Search ........................................ 23/183, 315

[56] References Cited

UNITED STATES PATENTS 2,670,273  2/1954  Munn .................................. 23/183 X Primary Examiner—Oscar R. Vertiz
Assistant Examiner—G. Alvaro
Attorney—Griswold & Burdick, Stephen S. Grace and William R. Norris

[57] ABSTRACT

A new compound having the general formula of $M_2E(OH)_4$, wherein M is Ea or K and E is Ba or Sr.

1 Claims, No Drawings

ALKALI METAL-ALKALINE EARTH METAL HYDROXIDES

BACKGROUND OF THE INVENTION

There are many instances in which it is desired to employ a single source of alkali metal and alkaline earth metal oxides. For example, glass batches contain both alkali metal oxide and alkaline earth metal oxide. If these oxides could be added to the batch from a single source, it would provide a convenient means for introducing the oxides into the batch and reduce materials handling requirements.

A primary object of the present invention is to provide a source material for alkali metals and alkaline earth metal oxides.

THE INVENTION

The present invention is an alkali metal-alkaline earth metal hydroxide complex having the general formula of $M_2N(OH)_4$, wherein M is an alkali metal of sodium (Ea) or potassium (K) and E is an alkaline earth metal of strontium (Sr) or barium (Ba). Such a complex, when heated to decomposition temperature, will produce the corresponding alkali metal hydroxide and alkaline earth metal oxide.

The hydroxide complex can be prepared by contacting NaOH or KOH with $Ba(OH)_2$ or $Sr(OH)_2$ for sufficient time and temperature to achieve chemical reaction. The reactant can be identified by the evolution of the heat of reaction and/or the setting up or cementing of the hydroxide mixture. Specifically, where anhydrous materials are used, the temperature should be above the melting point of at least one reactant to provide a liquid phase. Where aqueous solutions are employed temperatures on the order of 60° to 200° C. are appropriate.

The solid hydroxide complex so formed can be used as such or dried, ground and stored for later use. In a process requiring alkali metal and alkaline earth metal oxides, the complex is admixed with other components as may be required and heated to the complex decomposition temperature, i.e., about 400° to 600° C. The complex breaks down into MOH, EO and $H_2O$, thus providing a single source for alkali metal hydroxide and alkaline earth metal oxide.

The following examples serve to further illustrate the present invention.

EXAMPLE 1

12.1 grams anhydrous $Sr(OH)_2$ and 8 grams anhydrous NaOH are admixed and heated for 3 hours at 350° C. The mixture cemented into a solid, dry mass.

X-ray diffraction analysis of the mass showed a predominant pattern which disclosed the following interplanar spacings ($d$ in angstroms) for the form highest intensity ratios ($I/Io$):

| $d$—A. | $I/Io$ |
|---|---|
| 2.50 | 100 |
| 1.765 | 60 |
| 5.75 | 50 |
| 3.00 | 16 |

The starting components and amounts disclose the chemical formula of the mass to be $Na_2Sr(OH)_4$.

The above experiment was repeated using excess $Sr(OH)_2$. X-ray results showed the same pattern as above plus that of $Sr(OH)_2$.

EXAMPLE 2

17.1 grams anhydrous $Ba(OH)_2$ and 8 grams anhydrous NaOH were admixed and heated for 3 hours at 350° C. The mixture cemented into a solid, dry mass.

X-ray diffraction analysis of the mass showed a predominate pattern which disclosed the following interplanar spacings ($d$ in angstroms) for the four highest intensity ratios ($I/Io$):

| $d$—A. | $I/Io$ |
|---|---|
| 1.805 | 100 |
| 3.13 | 83 |
| 2.43 | 83 |
| 2.35 | 67 |

The starting components and amounts disclose the chemical formula of the mass to be $Na_2Ba(OH)_4$.

The above experiment was repeated using excess NaOH. X-ray results showed the same pattern as above plus that of NaOH.

EXAMPLE 3

12.1 grams anhydrous $Sr(OH)_2$ and 11.2 grams anhydrous KOH were admixed and heated for 3 hours at 350° C. The mixture cemented into a solid, dry mass.

X-ray diffraction analysis of the mass showed a predominant pattern which disclosed the following interplanar spacings ($d$ in angstroms) for the four highest intensity ratios ($I/Io$):

| $d$—A. | $I/Io$ |
|---|---|
| 2.97 | 100 |
| 2.33 | 100 |
| 1.81 | 100 |
| 2.71 | 100 |

The starting components and amounts disclose the chemical formula of the mass to be $K_2Sr(OH)_4$.

What is claimed is:

1. A compound consisting essentially of an alkali metal-alkaline earth metal hydroxide complex having a general formula of $M_2E(OH)_4$, wherein M is Na or K and E is Sr or Ba.